INVENTORS:
HERBERT J. HILDEBRANDT,
TAGE PETER SYLVAN,

BY  C W Baker

THEIR ATTORNEY.

FIG.9

INVENTORS:
HERBERT J. HILDEBRANDT,
TAGE PETER SYLVAN,
BY C.W. Baker
THEIR ATTORNEY.

United States Patent Office 3,450,153
Patented June 17, 1969

3,450,153
ELECTRICAL PULSE GENERATOR AND REGU-
LATOR FOR FLUID FLOW AND LIKE CON-
TROL SYSTEMS
Herbert John Hildebrandt, Baldwinsville, and Tage Peter Sylvan, Liverpool, N.Y., assignors to General Electric Company, a corporation of New York
Filed June 26, 1967, Ser. No. 648,885
Int. Cl. F16k 31/02; A61m 5/16
U.S. Cl. 137—486
17 Claims

ABSTRACT OF THE DISCLOSURE

This disclosure is of a fluid flow rate control for intravenous feed and like applications wherein flow occurs in drop-wise fashion. The occurrence of each drop is sensed by means operative to generate an electrical pulse in time coincidence with it, and flow rate control then is accomplished in response to error signals indicative of the direction and extent of any timing error of each drop pulse. Electrical capacitance means are described for drop sensing, and the flow rate error signals are produced by comparison of the sawtooth voltage output of an RC timing signal generator against a reference, the timing signal generator having its RC time constant adjustable to enable balance against the reference at any of a range of called-for flow rates. An electrical servo system which operates through one complete control cycle in response to the pulse timing error signals produced by each drop is provided for readjusting the flow control device to correct flow rate errors to within any system deadband provided. Various provisions for enhancing stability, reliability and response speed of the system are described, as is its utility in other control applications wherein pulse timing provides an available measure of the parameter to be controlled.

Background of the invention

This invention relates generally to electrical control systems of the type operative to maintain a selected operating parameter at predetermined value, and more specifically it relates to control means for such systems wherein any deviation from the called-for value of the controlled parameter is manifested as an electrical pulse timing error providing a measure of the direction and magnitude of the deviation. While the control system of this invention has general utility in many applications wherein deviation of the controlled parameter from the preselected value is measurable as a pulse timing error, the invention affords particular advantage as applied to automatic control of fluid flow rate in intravenous fluid feeding and other fluid flow control systems wherein the desired flow rates are such as to permit drop-wise flow of the fluid. In such systems flow rate error may be sensed and corrected as a drop timing error, by drop sensor means operative to generate an electrical pulse in time correspondence with each drop, and by control means operative in response to any timing error of the pulses thus generated to readjust the fluid flow rate as necessary to hold the called-for value.

Presently in hospital general ward practice the administration of intravenous fluid feeding usually is performed using a disposable kit comprising a length of flexible rubber or plastic tubing connecting at one end to the injection needle and connecting at its other end to a transparent plastic or glass drop chamber which in turn connects into the supply flask containing the fluid to be injected. This drop chamber serves a number of purposes, among which are a more precise control of fluid pressure head than would be possible if the fluid in the main supply flask defined the pressure head, and the provision of what is effectively a visual indicator of fluid flow rate enabling manual control of flow rate by the attending nurse. The necessary flow adjustment normally is accomplished by a manually adjusted screw clamp or similar restrictive device which is applied to the tubing somewhere along its length and manipulated by the nurse to set the desired flow rate.

Each drop of fluid through the drop chamber contains approximately 0.1 cubic centimeter of liquid, and this approximation provides the standard by which flow rate may be set. For example, if the called-for flow rate is 360 cc. per hour, one drop per second then would be required to maintain this rate. For a rate of 720 cc. per hour it would naturally follow that two drops per second would be required, since flow is inversely proportional to time. Any desired flow rate thus can be set by simple conversion of cc. per hour to drops per second.

In practice the nurse visually observes and counts drops entering the drop chamber over a period of time, say 10 or 20 seconds for the flow rate just mentioned, and mentally calculates whether the observed drop rate is correct or is more or less than the called-for value. She then adjusts the clamp or other restrictive device on the tubing in a direction to correct any error in the drop rate observed, then again counts drops and again readjusts the clamp if necessary, and repetitively continues these steps until in her opinion the correct flow rate has been established and is being maintained.

This repetitive adjustment is of course laborious and time consuming, and flow rate control in this manner presents the further problem that even though flow is initially correctly set the flow rate may subsequently be disturbed by any of several factors such as change in position of the patient or shifting of the needle so that its opening is less freely open. To avoid these and other problems of manual control as just described, it has previously been proposed that this control be mechanized so as to accomplish continuously and automatically essentially the same functions as previously performed manually.

For example, instead of visual observation of drops in the drop chamber a photoelectric or like drop sensor may be mounted adjacent the drop chamber so as to respond with a pulse output each time a drop falls, these drop pulses are counted and averaged over a time period of length adequate to provide a meaningful measure of drop rate, the measured drop rate thus derived is compared against a called-for value of drop rate, and the drop rate error if any is used to control a motor the motion of which drives a clamp device variably constricting the tubing to adjust the flow rate in a direction to correct the drop rate error observed.

These automatic control systems have in practice generally presented their own difficulties and problems. Perhaps the most difficult problem is that of achieving desired accuracy of fluid flow rate control over the extremely wide range of fluid flow rates through which adjustment must be accomplished, this range typically extending between about 10 cc. per hour at the extreme low end and up to 1,000 cc. per hour at the high. If the system is provided with sensitivity and speed of response adequate to accommodate the high end of this range it becomes extremely difficult to stabilize the system against oscillation and hunting at the low end of the range. There is a tendency for the motor or other mechanical adjustment device by which the tubing is constricted to run more or less constantly, particularly at very low drop rates, and this constant running of the motor may be distressing to the patient as well as detract from the accuracy of control of fluid flow rate. Also, the photoelectric sensor and light source arrangement is necessarily relatively complex and accordingly may want for reliability, and extreme care may be required on the part of the nurse to properly align the sensor with respect to the drop chamber.

Primarily for these reasons automatic control systems for fluid flow rate control in intravenous fluid feeding and like low-flow high-precision fluid flow control applications have not yet come into the wide use which the economics particularly of the intravenous flow feeding problem might otherwise have prompted. The present invention has as a principal objective the provision of automatic control systems satisfying the needs of this and like applications, wherein good accuracy of flow rate control is afforded over an extremely wide controlled range, and wherein operation of the system is fully stable over the entire range of flow rate adjustment. The invention also has as an object the provision of improved drop sensors for use in systems of this kind, and of improved mechanism for accomplishing adjustment of fluid flow rate, and has as a further objective the provision of automatic control systems and subsystems useful also in controlling operating parameters in other systems wherein the controlled parameter is in the form of or can be translated into the form of electrical pulses the timing error of which provides a measure of the departure of the controlled parameter from its set value.

*Summary*

In brief, control systems in accordance with this invention avoid the problems characteristic of flow rate control through drop pulse count averaging, by instead sensing the timing of each individual drop pulse and controlling in response to the timing error, if any, of the individual drop pulse. This drop timing error measure is taken by comparing the sawtooth voltage output of an RC timing signal generator against a reference voltage at the moment of occurrence of the drop pulse. If the drop is precisely on time these voltages will be equal and this will indicate zero error; if drop timing is off this will be indicated by an error voltage of magnitude and polarity dependent upon the amount and direction of timing error of the individual drop. Preferably this error indication is provided by two distinct error signals, one being a direction signal which indicates whether the drop occurred early or whether it occurred late, and the other being an absolute magnitude signal providing a measure of the magnitude of the drop timing error. The first of these drop timing error signals controls the direction in which the output motor may run and thus the direction in which the flow constriction device is driven to correct the error in drop timing sensed; the second of the two signals determines how long the output motor is to be permitted to run to accomplish correction, or holds the motor idle if the error is zero or is so small as to be within the system deadband provided. In this way the corrective action taken by the system, and the direction and extent of any corrective movement by the output motor, is made dependent on the direction and extent of the timing error of each individual drop in response to which each cycle of corrective action is initiated.

This affords good stability within the servo loop even at very low flow rates, because the error signal need not be integrated over the relatively long periods between drops and because the error signal may be made of magnitude relatively independent of the called-for flow rate. Preferably the adjustment of flow rate setting over the control range is accomplished by use of an RC timing signal generator the time constant of which is adjusted by a pair of switched decade resistors of stepped values such that the sawtooth voltage output of the RC timing sweep generator always is of the same value if the drop occurs at the correct time, irrespective of flow rate setting and thus of the length of the time between drops. A reset, triggered by a a pulse generated in response to each drop, restores the RC timing signal generator output voltage to zero immediately after the sawtooth voltage has been sensed and compared against a reference to determine the direction and magnitude of drop timing error, this comparison being also triggered by the drop pulse.

The timing error direction signal is used to control a flip-flop through which supply current is transmitted to the output motor, the direction of drive of the motor being dependent upon the state of the flip-flop as determined by the timing error direction signal. The timing error magnitude signal controls the duration of drive current supply to the motor by triggering a variable one-shot multivibrator to produce an output signal which is of length proportional to the magnitude of the timing error magnitude signal and which gates the flip-flop on for a time period of like duration, so that drive current is supplied to the motor for a time proportional to the drop timing error magnitude signal and in a direction dependent upon the drop timing error direction signal. Preferably the motor is of a type which does not respond to its drive current supply unless the supply is switched on for a period of at least several milliseconds, as the deadband thus provided assists in stabilizing the system and in minimizing hunting action by the motor.

As previously mentioned, operation of intravenous fluid feeding systems in accordance with the invention is further enhanced by provision of a drop sensor not requiring any light source or photoelectric cell. This sensor is of capacitance type and comprises a pair of capacitor plates between which the drop chamber is mounted so as to provide a perceptible capacitance change each time a drop falls through the space between the plates, due to the change in effective dielectric constant within the drop chamber as the drop passes therethrough. The variable capacitance thus constituted couples the output of a fixed frequency oscillator to an amplifier and pulse shaping network, which processes and shapes the pulse produced by amplitude modulation of the oscillator output due to the change in reactance of the variable capacitor, and transmits this shaped pulse to the drive motor control circuit for resetting the RC timing sweep generator and for triggering the drop timing error direction and magnitude measurements.

The invention also comprehends simplified mechanical arrangements by which the output motor variably constricts the tubing through which fluid flow is to be controlled, and by which the tubing may be inserted into operative relation with the flow constriction means for control thereby. As will become apparent from the description hereinafter, introduction of the tubing is possible merely by direct mechanical insertion, after momentarily actuating a motor drive control switch which drives the motor to full flow position and thus fully opens the variable constriction device.

Because corrective action by the system of this invention is taken, when needed, in response to the timing error of each individual drop, it is apparent that at very low fluid flow rate, say at 10 cc. per hour which would call for a drop time of 36 seconds, the system would respond relatively slowly to a change in called-for fluid flow rate from very low to very high value. To reduce this required response time, the system preferably incorporates a "no-drop" circuit which effectively operates to generate a false or pseudo drop signal under these conditions. The control then is triggered by this "no-drop" signal to accomplish corrective action in the same way as accomplished in response to true drop signals but in substantially shorter time.

As will be obvious, the invention in many of its aspects is not limited to use in fluid flow rate control systems but may be used as a closed loop servo system of utility in other applications where in the system parameter to be controlled can be measured as a series of pulses the timing error of which provides a measure of the departure of the controlled parameter from its set value, and will afford particular advantage in such applications wherein the dynamic range is very broad and good system stability is required over the entire range.

Brief description of the drawings

The foregoing and other objects, features and advantages of the invention will become more fully apparent and the invention further understood by reference to the following detailed description when read in conjunction with the accompanying drawings, wherein.

Description of preferred embodiments

Figure 1:
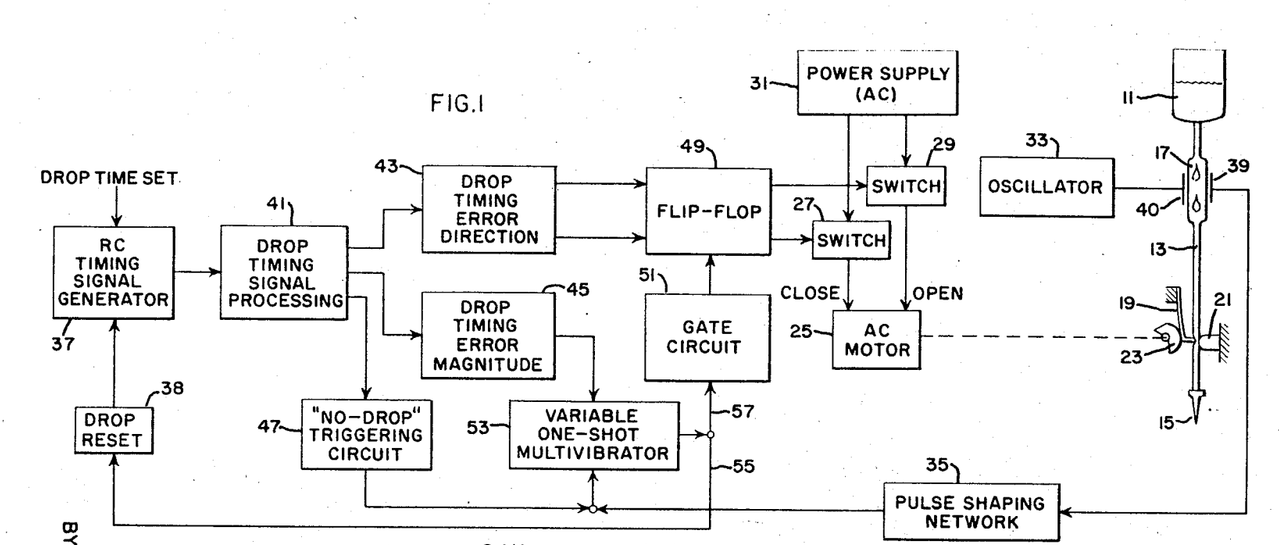
FIGURE 1 is a block diagram of an intravenous fluid feeding system in accordance with the invention.

With continued reference to the drawings, wherein like reference numerals have been used throughout to designate like elements, FIGURE 1 illustrates a preferred embodiment of the invention as applied to an intravenous flow feeding system. This system comprises a supply flask 11 which connects through a length of flexible rubber or plastic tubing 13 to the injection needle 15, a tubular drop chamber 17 of glass or transparent plastic being interposed in this flow line preferably immediately adjacent the flask 11 as shown. In present hospital practice the elements just described are of single-use or disposable type; they are supplied sterilely packaged as an assembly, used once, and then discarded.

The flow rate control system of this invention is usable with such disposable assemblies with no possible compromise of their sterility, and without itself requiring sterilization between uses, because it does not connect into the flow line or otherwise contact the fluid being fed, but controls its flow rate by variably constricting the flexible tubing 13. For this purpose there is provided a knife edge member 19 which squeezes the tubing 13 against an anvil member 21, the knife edge 19 being spring loaded away from the tubing and driven against it by a cam 23 which is in turn driven by an electric motor 25.

This motor 25 is of AC synchronous type and reversible to drive in one direction or the other depending upon the operation of two switches 27 and 29 through which the motor connects to an AC power supply 31. These switches are so arranged that whenever switch 27 is energized the motor 25 drives in a direction such that cam 23 operates to close or further constrict the tubing 13 and thus reduce fluid flow rate therethrough; whenever switch 29 is energized the motor 25 and cam 23 drive in reverse direction to thus effect an increase in fluid flow rate to the injection needle 15.

As previously indicated, the intravenous flow feeding system of this invention controls the fluid flow rate by sensing the time of occurrence of each drop as it falls through the drop chamber 17. This drop sensor preferably comprises a fixed frequency oscillator 33 which is capacitor coupled to a pulse detector and shaping network 35, the capacitive coupling being provided by a pair of metal plates 39 and 40 between which the drop chamber is inserted. The capacitor dielectric then is constituted by the drop chamber and its contents, and the dielectric constant of the medium thus constituted changes depending upon the presence or absence of a drop passing through the drop chamber. The resulting fluctuations in effective dielectric constant cause a corresponding change in the coupling of the oscillator output signal to the pulse shaping network 35, and in effect act to modulate the oscillator signal so as to provide an amplitude modulated output comprising a series of pulses each of which corresponds to, and is in time coincidence with, the passage of one drop through the drop chamber 17. Pulse shaping network 35 detects and shapes this pulse as necessary to the input requirements of the control circuit next to be described.

This control circuit constitutes a closed loop servo system which senses any error in timing of each individual drop and energizes one or the other of the motor drive switches 27 and 29 for motor 25 in a manner to accomplish appropriate corrective action. To provide the necessary time reference for drop timing measurement there is included an RC timing signal generator 37 arranged to enable adjustment of its RC time constant preferably by change of resistance values, as indicated by the "DROP TIME SET" input shown. This generator operates to produce a voltage output of sawtooth waveform, with the voltage rising along the usual RC charging voltage curve until the charging capacitor is reset by the "DROP RESET" input shown at 38, at which time the voltage output drops to zero preparatory to the next charging cycle. Preferably the RC time constants in the timing signal generator 37 are so adjusted that if the drop reset pulse occurs at precisely the called-for moment in time, the voltage output of generator 37 will, at the moment in time at which reset occurs, be always at the same value of voltage for all flow rate settings.

In this way, comparison at the moment of reset of the value of voltage output of generator 37 against a fixed voltage reference, can provide a measure of the timing error, if any, of the drop which triggered the reset. If the RC timing signal voltage was precisely equal to the reference value at the time of reset, then the timing of that drop was precisely correct; if the timing signal voltage was higher than the reference at the moment of reset this would indicate that the RC charging current had been permitted to flow longer than the called-for interval, thus generating the higher-than-reference value of voltage and indicating that the time of occurrence of the drop was delayed; if the timing signal voltage is less than the reference value this indicates that the drop occurred prematurely and before the capacitor in the RC timing signal generator had had time to charge to the fixed reference value. Accordingly, the value of the sawtooth voltage at the moment of reset, when compared against the reference value, provides both an indication as to whether the particular drop which triggered the reset was on time or was early or late, and an indication of the magnitude of the time error of the drop.

To enable the voltage comparisons needed to derive these indications, the timing signal generator output signal is processed as at 41 to provide two control signals one of which appears as at 43 to provide an indication of the direction of drop timing error; i.e., whether early or late. The other such signal appears as at 45 and provides an indication of the absolute magnitude of the error in drop timing, irrespective of its direction. A third signal also is provided to a "no-drop" triggering circuit 47 the purpose and operation of which will be explained later.

The drop timing error direction circuit 43 controls a flip-flop 49 in a manner such that the flip-flop assumes one or the other of its two possible states depending upon the polarity of the difference between the drop timing signal and a fixed reference voltage of value corresponding to the "on time" value of the drop timing signal. Depending upon the polarity of any difference between these voltages, flip-flop 49 will assume one or the other of its two possible conductive states and will transmit, under control of a gate circuit 51, a control signal to one or the other of the motor current supply switches 27 and 29 the operation of which has previously been explained.

The gate circuit 51 operates under control of the drop timing error magnitude signal as supplied to a variable one-shot multivibrator 53. As noted above, the signal as supplied through the drop timing error magnitude circuit 45 is a voltage of value proportioned to the absolute value of the timing error signal and independent of the direction of the timing error. The multivibrator circuit 53 accepts this error input signal and, when triggered by a drop pulse signal supplied through pulse shaping network 35, produces an output pulse beginning at a point in time coincident with the beginning of the drop pulse and continuing for a time period of duration proportional to the magnitude of the drop timing error signal. In other words, the multivibrator output pulse begins when triggered by a drop pulse and is of time duration proportioned to the magnitude of any error in timing of that same drop pulse.

The multivibrator output connects through lead 55 to the "DROP RESET" circuit 38 where it provides the necessary drop pulse input to reset the RC timing sweep generator as previously described. The multivibrator also connects via a lead 57 to control the gate circuit 51 and, through it, also to control the flip-flop 49. Here the control action is such as to disable the flip-flop between multivibrator output pulses and to enable it through the duration of each such pulse. This energizes the drive motor 25 through one or the other of switches 27 and 29, depending upon the state of the flip-flop 49 as determined by the direction of the drop timing error, for a time period equal to the duration of the multivibrator pulse. Since as previously indicated each multivibrator pulse is of duration proportional to the magnitude of the timing error of the drop which triggered that pulse, the drive motor 25 is energized after each drop pulse for a time period proportioned to the drop timing error magnitude. Motor 25 accordingly will run in a direction and for a time period as necessary for corrective action appropriate to the direction and magnitude of the drop timing error sensed.

For purposes of system stability, and to avoid "hunting" and other unessential motion of the drive motor 25, the motor or its drive circuit preferably is provided with a deadband of width such that the motor does not respond to drive current pulses gated to it by the variable one-shot multivibrator 53 unless the pulses are of predetermined minimum duration indicative of a drop timing error of magnitude outside the desired limits of system sensitivity. It will be appreciated that multivibrator 53 will produce at least a very short output pulse for every drop, including those drops which are precisely "on time," since such pulse is necessary to operation of the drop reset circuit 38 to which the multivibrator 53 also transmits its output and in which this pulse serves a variety of purposes as hereinafter more fully explained. The deadband provided prevents motor response to such "on time" pulses or to any drop pulses other than those the length of which is such as to reflect a significant drop timing error requiring corrective action.

From the description already given, it will be understood that the control system of this invention operates to sense drop timing error and to take corrective action in a direction and to an extent dependent upon the direction of magnitude of the error sensed, one such control cycle being initiated and accomplished, if correction is needed, each time a drop occurs. At times when the "DROP TIME SET" input is being changed to command an increase in fluid flow rate from an initially very low value to some much higher value, the system would tend to respond only relatively slowly to this command because the drops would at that time be coming only relatively infrequently and corrective action would be taken only at the moment at which each drop occurred. To accelerate system response under these conditions, and also to avoid any possible hang up in system operation due to other causes, the "no-drop" triggering circuit 47 supplies an artificially induced drop pulse. The "no-drop" pulse thus provided may be timed to occur sufficiently quickly that satisfactorily fast system response to a change in called-for fluid flow rate is accomplished even when starting from very low fluid flow rates. As will be explained this can be done without interference with the normal error sensing and control operation of the system.

Figure 8:
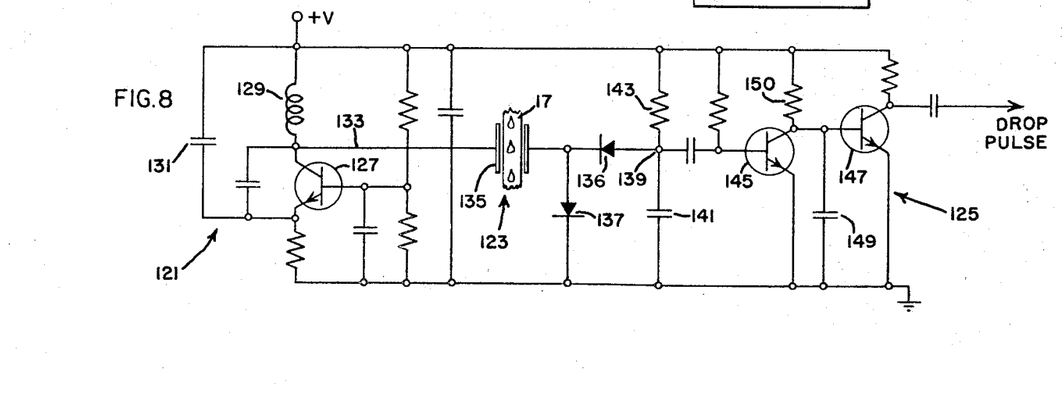
FIGURE 8 is a schematic circuit diagram of a drop sensor circuit suitable for use in the intravenous fluid feeding system of FIGURE 1.
Figure 9:
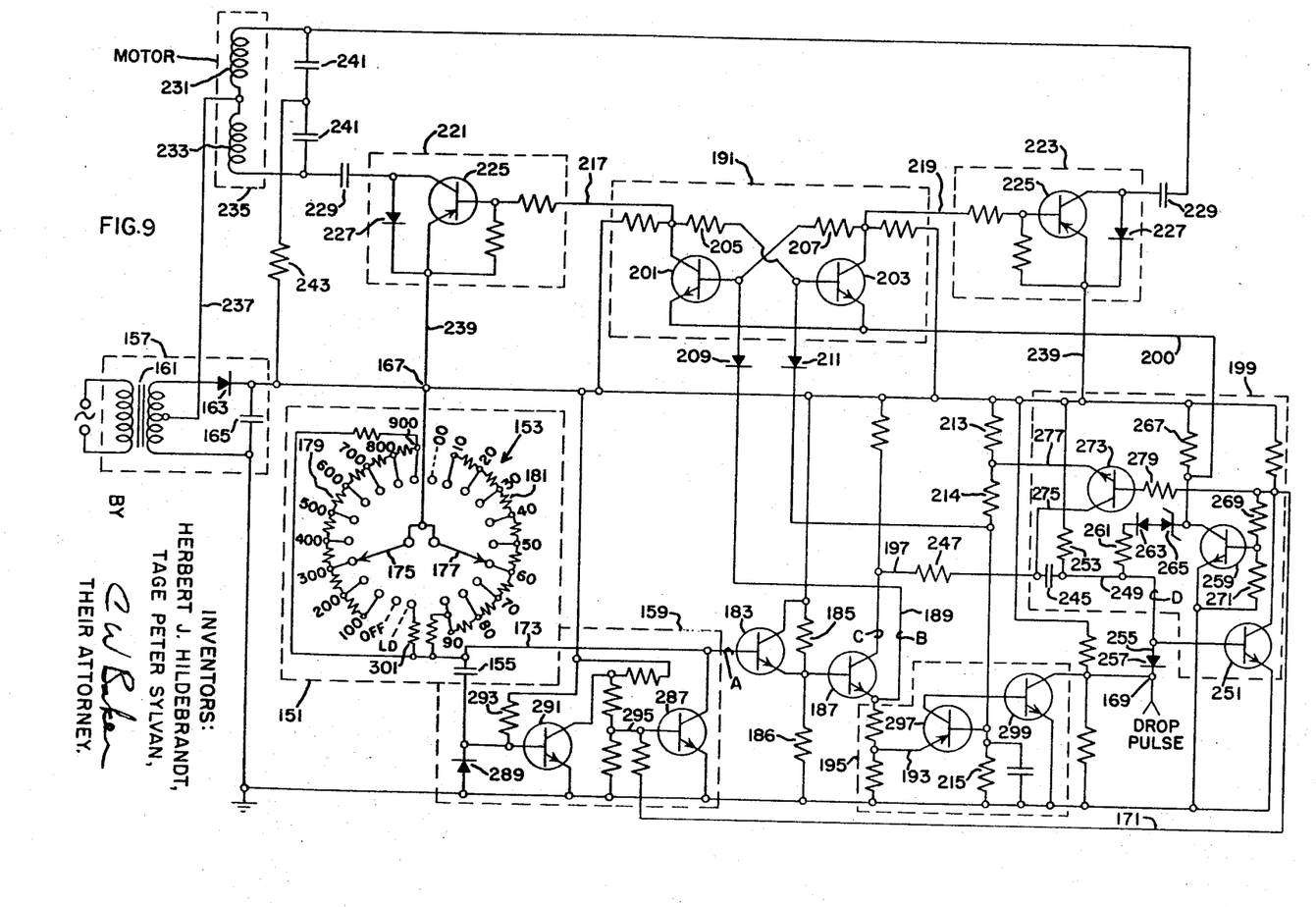
FIGURE 9 is a schematic circuit diagram of flow rate setting, drop timing error sensing and motor drive circuits suitable for use in the intravenous fluid feeding system of FIGURE 1.

The construction and operation of the "no-drop" and other circuits just described will be more fully understood by reference to the circuit diagrams of FIGURES 8 and 9, but before referring to those figures it may be helpful to consider certain details of the mechanical arrangement of an intravenous flow feeding system in accordance with the invention as illustrated in FIGURES 2–6. As shown, the system may conveniently be packaged in two interconnected units, a drop sensor unit designated generally by reference numeral 61 and a control unit designated generally reference numeral 63, the necessary electrical interconnection between these units being afforded by a multiconductor cable 65. The drop sensor 61 clips to the standard drop chamber 17 as shown, from which the flexible tubing 13 depends. This tubing is inserted into a channel 67 in control unit 63 within which is located variable constriction means (not visible in FIGURE 2 but shown and described later) for control of the rate of fluid flow through the tubing, once flow is permitted to begin by release of a manually operable clamp 69 of conventional type. Suitable clamp means may be provided if desired as at 71 for detachably mounting the control unit 63 to a tubular support member 73 which conveniently may form part of the conventional stand from which is hung the flask 11.

Figure 2:
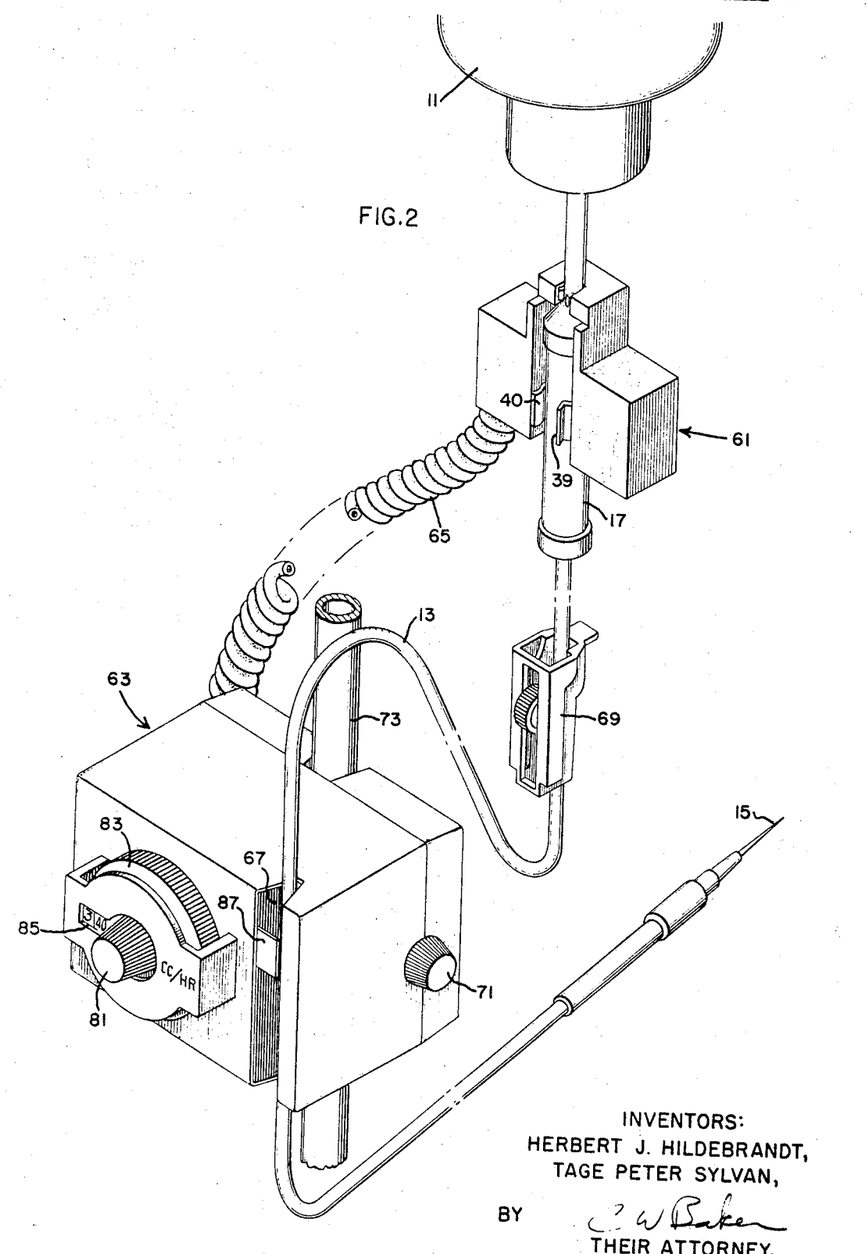
FIGURE 2 is a general perspective view of the flow rate control and drop sensor units of an intravenous fluid feeding system in accordance with the invention.
Figure 3:
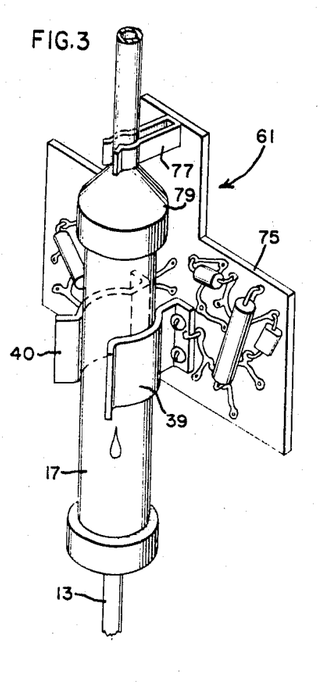
FIGURE 3 is a perspective view of the drop sensor unit of FIGURE 2 with its enclosing housing and certain other elements removed.

The drop sensor unit 61, minus its enclosing housing shown in place in FIGURE 2, is illustrated in FIGURE 3. As there shown, this unit comprises a printed circuit board 75 to which the various electronic components of the sensor may be mounted in conventional manner and to which may be affixed the capacitor plates 39 and 40 as illustrated. These plates are of a metal such as brass and are of configuration such that they fit closely and resiliently about the drop chamber 17 when in place on it. In addition to or in lieu of the attaching means which the capacitor plates 39–40 themselves constitute, a spring clip 77 may be provided for detachably engaging the drop chamber as at 79.

The drop sensor assembly 61 may in this way be attached to and detached from the drop chamber 17 and when in place operates to sense the passage of each fluid drop through the chamber. The electrical characteristics and operation of the capacitor plates 39–40 and other components of the drop sensor assembly will be more clearly understood from reference to the detailed circuit diagram of FIGURE 8 which will later be described; suffice it to note here that the drop sensor assembly constitutes a small, light and relatively rugged unit which may be quickly and easily connected to the conventional drop chamber and as readily removed therefrom after use.

Figure 7:
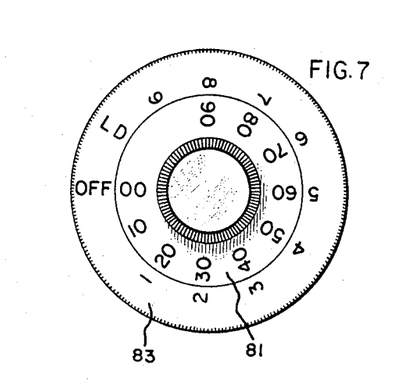
FIGURE 7 illustrates dial settings for control of flow rate in the system of FIGURE 2.

Referring again to FIGURE 2, it will be noted that the control unit 63 comprises a pair of concentrically disposed control knobs 81 and 83 for fluid flow rate setting, the dial setting appearing in window 85 and preferably being calibrated in terms of cc per hour. The decade related settings of knobs 81 and 83 are best shown in FIGURE 7, in which it will be seen that the inner knob 81 provides settings of tens of cc per hour and the outer knob 83 provides settings for hundreds of cc per hour. An "OFF" and an "LD" (load) setting also may be provided, the latter being for the purpose of driving the variable constriction device enclosed within channel 67 (FIGURE 2) to full open position to facilitate insertion of the tubing as will be explained. A flag 87 which as shown in FIGURE 2 projects into channel 67 at all dial settings other than "OFF" or "LD" provides visual indication that the unit is in operation.

Figure 4:
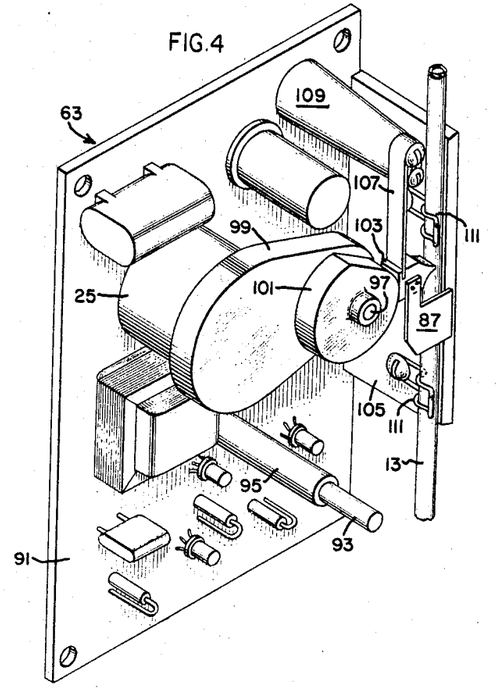
FIGURE 4 is a perspective view of the flow rate control unit of FIGURE 2 with its enclosing housing and certain other elements removed.

Mechanical details of these and other features of a preferred embodiment of this control unit 63 are illustrated in FIGURE 4, which shows the drive motor 25 and other elements fixed to a mounting plate 91. This plate may also serve as a circuit board having mounted to it various components of the control circuitry including the flow rate setting switches. These switches are located behind the plate in FIGURE 4 so that only their concentrically disposed shafts 93 and 95, to which the knobs 81 and 83 (FIGURES 2 and 7) respectively attach, are visible. Motor 25 drives an output shaft 97 through a reduction gear chain enclosed within a housing 99 mounted to the motor. A cam 101 fixed to the motor shaft 97 is provided with a cam follower member 103 positioned by the cam to variably constrict the tubing 13 between itself and an anvil member which as shown is constituted by a plate 105 fastened to or formed integrally with the mounting plate 91. Preferably this cam follower 103 is carried by a spring arm 107 fixed at its end remote from the follower to a mounting stud 109 carried by plate 91, with the spring being biased so as to urge the cam follower in the direction away from the tubing and against the cam. To assure that the tubing is easily insertible into position between the cam follower and anvil, and to hold the tubing in place after insertion, spring clip members 111 are provided formed of spring wire stock to the configuration illustrated.

Figure 5:
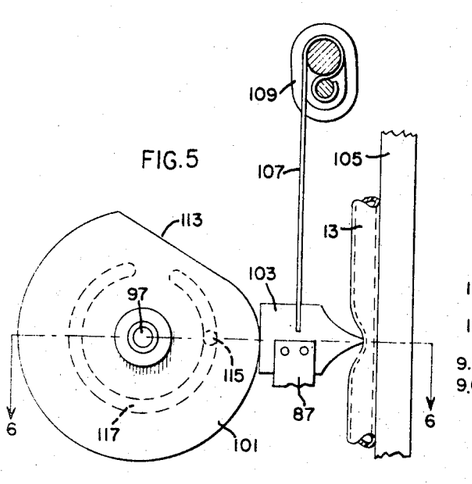
FIGURE 5 is a slightly enlarged perspective showing of the cam and cam follower for controlling flow rate in the system of FIGURE 2.
Figure 6:
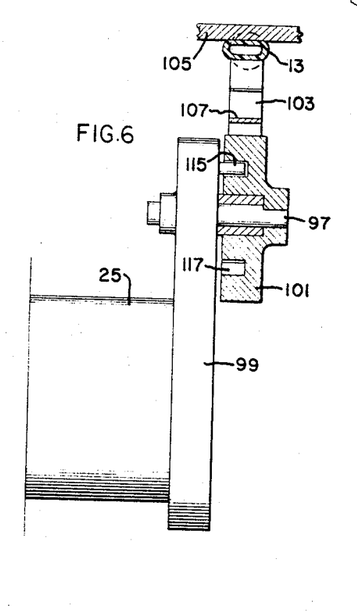
FIGURE 6 is a part-sectional view taken generally along the line 6—6 in FIGURE 5.

As best illustrated in FIGURE 5, the cam 101 may conveniently be made in the form of a generally circular disc provided with a flat as at 113. This flat permits use of a relatively smaller cam than would otherwise be possible, because it provides a substantially larger movement of the cam follower member in tube-constricting direction when the system is just beginning to drive from its full open or load position to an operating position in which fluid flow rate is controlled in accordance with settings of the control knobs 81–83. In going the other way, when the cam follower rides onto the flat only a relatively small rotation of the cam then is necessary to achieve a relatively large movement of the follower away from the tubing, thus providing a wider space for removal and insertion of the tubing and more fully retracting the flag 87. In this way the major segment of the cam operating surface is kept available for use in the operating range itself, and this in turn permits a more precise control of cam follower position as a function of motor output shaft position than would be possible if the flat were not provided. To provide absolute limits on cam travel in both directions, a pin 115 fixed to the motor housing 99 cooperates with a slot 117 cut in the cam 101 to limit its travel as best shown in FIGURES 5 and 6.

In use of the units just described, the operator simply attaches the sensor unit 61 to the drop chamber included in the standard intravenous flow feeding kit, adjusts knob 83 on control unit 63 to its "LD" setting causing motor 25 to drive to a position such that the cam follower 103 rides onto the cam flat 113, thus retracting flag 87 and fully opening the space between the cam follower 103 and the anvil surface 105 against which it squeezes the tubing. The operator then inserts the tubing into the spring clips 111 and into the space between the cam follower and anvil, and adjusts knobs 81 and 83 to establish and maintain automatically the fluid flow rate called for by their dial settings.

As the motor 25 begins to drive from the full open position which the "LD" setting of knob 83 had caused it to assume, the cam follower 103 rides off the flat 113 and onto the circular portion of the cam, and in doing so is quickly driven over into operating engagement with the tubing 13 to thereupon variably constrict the tubing as necessary to control the fluid flow rate through it to the called-for value as established by dials 81 and 83. Further details on the manner in which fluid flow rate control is thus established and maintained will be given in the description of the drop sensor and control circuits of FIGURES 8 and 9, to which reference will next be made.

The drop sensor as shown schematically in FIGURE 8 comprises an oscillator 121 which is capacitively coupled through the drop chamber and capacitor assembly 123 to a drop pulse detector and shaping circuit designated generally by reference numeral 125. Oscillator 121 may be of any conventional configuration providing an output at relatively fixed amplitude and frequency, the preferred operating frequency being in the range of one to ten megahertz. As illustrated the oscillator comprises a transistor 127 connected in a conventional Colpitts oscillator configuration to produce an output signal of frequency determined by the inductance and capacitor elements 129 and 131, respectively, and to transmit this output signal via a lead 133 to one of the plates 135 of the drop sensing capacitor assembly 123. The capacitance of this assembly varies as previously explained when a drop passes through the chamber 17, due to the change in effective dielectric constant as the drop falls through.

The oscillator output signal as coupled through variable capacitor assembly 123 is shifted with respect to ground by diodes 136 and 137 so that the voltage on this side of the drop sensor remains always negative, and is of amplitude dependent upon the presence or absence of a drop chamber 17. When a drop falls the capacitance increases, and this capacitance increase is reflected as a modulation of the ampltiude of the signal at the point 139. This amplitude modulation pulse is peak detected by a capacitor 141, to produce at point 139 a negative-going pulse of width dependent upon the RC time constant of the network formed by the capacitor 141 and a resistor 143 through which it connects to the positive voltage supply. The drop pulse thus produced is capacitor coupled to the base of a transistor 145 the collector of which provides an amplified pulse output to the base of an output transistor 147, with shaping of the pulse waveform as impressed on the base of transistor 147 by a capacitor 149 and resistor 150 which serve to normalize the pulse width so that all pulses are of essentially the same width.

The operation of the drop sensor circuit just described will be apparent from what has already been said, and in practice it has been found that this circuit provides a very sensitive drop sensor capable of affording good reliability of drop indication and good discrimination between drops even at high flow rates. Experiment has shown that careful alignment of the sensor elements with respect to the drop chamber is not necessary to assure reliability of drop sensing, so very little time and care is required of the user in order to place the drop sensor onto the drop chamber or to remove it therefrom. Also, because of its all solid state construction and the absence of photoelectric devices and light sources for them, the sensor unit of this invention offers long and trouble-free service.

The drop pulses generated by the drop sensor circuit of FIGURE 8 are transmitted to the control circuit of FIGURE 9, which compares the time of occurrence of each drop against a reference to thus derive a measure of drop timing error, and which takes corrective action in the event such error exceeds some predetermined minimum value. The drop time reference is provided by an RC timing signal generator circuit, designated generally by reference numeral 151, comprising resistance means 153 and capacitance means 155 connected in series relation with each other and also with a DC voltage supply designated generally by reference numeral 157 and with ground through a reset circuit designated generally by reference numeral 159.

Power supply 157 comprises an AC transformer 161, a half-wave rectifier 163 and a filter capacitor 165 which together provide a DC voltage of suitable value, say 20 volts, at the point 167 at which the voltage supply to the RC timing signal generator 151 is taken. The construction and operation of the reset circuit 159 will be described later; suffice it to note here that during the charge cycle this circuit operates to connect the lower or negative side of capacitor 155 to ground, during the reset cycle it operates to connect the upper or positive side of the capacitor to ground, and it is triggered to cause such reset each time a drop pulse from the drop sensor of FIGURE 8 is received at terminal 169 and translated to a "reset" pulse which is transmitted on lead 171 to the reset circuit 159.

Figure 11:
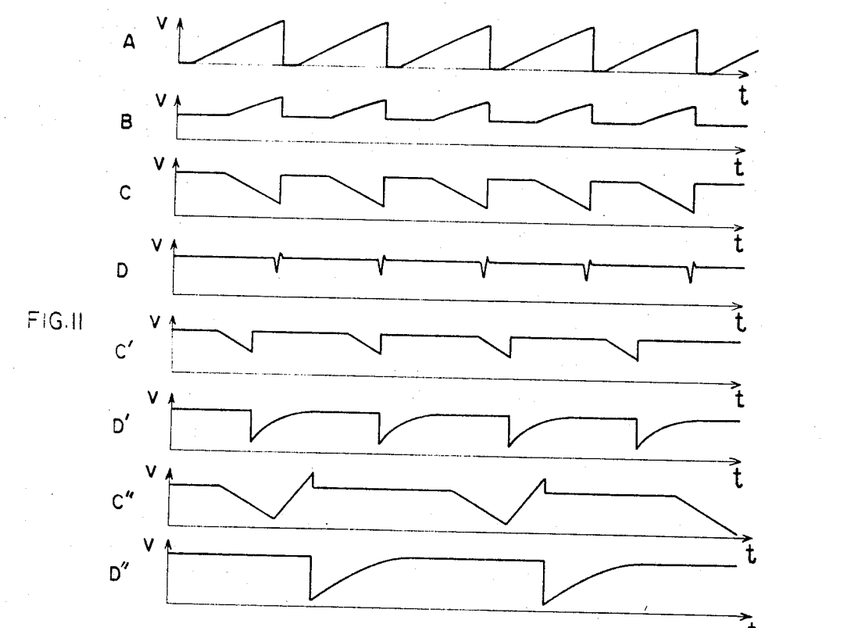
FIGURE 11 illustrates typical waveforms at the points indicated by the letters A–D in the circuit of FIGURE 9.

The RC timing signal generator 151 and reset circuit 159 work together to produce on lead 173 an output waveform of sawtooth configuration as in waveform A in FIGURE 11. The amplitude of the peaks of this sawtooth waveform will vary directly with the time duration of the charging period before which reset occurs, and inversely with the resistance value of the resistor means 153. Due to this inverse relationship, it is possible by proper selection of the values of resistance 153 to produce a charging rate such that the amplitude of the voltage output on lead 173 always will be of the same predetermined value at the moment of reset, if the reset pulse and the drop which triggers it are precisely on time. However, if the drop is early the RC circuit will not yet have had time to charge to this predetermined value and the voltage on lead 173 will accordingly be low, and if the drop is late the RC charging circuit will have charged above this value to some higher voltage value before reset and such higher voltage on lead 173 will reflect the drop timing error.

The necessary adjustment of the time constant of this RC timing signal generator is afforded by a pair of decade switches 175 and 177 which respectively operate to switch into parallel connected relation selected resistors of a "hundreds" resistance bank 179 and of a "tens" resistance bank 181. These resistance banks and the decade switches which control them provide a resistance value properly related to the value of capacitance 155 to command a fluid flow rate, in cc. per hour, corresponding to the numbers indicated adjacent the "hundreds" and "tens" resistance banks, respectively. The basis for selection of appropriate resistance values for use in these "hundreds" and "tens" decades will be further discussed hereinafter, after describing the remainder of the electrical circuit.

As just explained, the waveform on lead 173 is a sawtooth having each peak of the same fixed magnitude, say 9 volts in the particular embodiment being described, so long as each successive drop occurs precisely on time. If a drop is early, the sawtooth will peak at lower value due to the shorter period of charging current flow to capacitor 155 before reset is triggered by the premature pulse; if a drop is late the sawtooth will peak at higher value due to the longer charging time afforded by the delayed drop pulse. The drop timing error measure thus constituted is transmitted to the base of a transistor 183 connected in emitter follower configuration and back biased by resistors 185 and 186 to some fixed voltage, say 7 volts. When the signal applied on lead 173 exceeds this 7 volts, the emitter of transistor 183 then follows the input voltage minus the transistor's base-emitter voltage drop, and transmits the signal thus modified to the base of another transistor 187. This transistor provides a first emitter follower output on lead 189 to a flip-flop designated generally by reference numeral 191, where it controls the direction of drive motor operation in a manner to be explained. A second such output is provided on lead 193 to a "no-drop" triggering circuit 195 also to be explained. The signal on both these leads 189 and 193 is generally as shown by waveform B in FIGURE 11, and is similar to the output of the RC timing signal generator (waveform A) except for its 7 volt offset resulting from the back-biasing action of resistors 185 and 186. Waveform B peaks at say 9.0 volts for "on-time" drops in the particular embodiment being described.

At the collector of transistor 187, the waveform is as shown at C, C' or C" in FIGURE 11, depending upon whether the drops are on time (waveform C), are early in time (waveform C') or are late in time (waveform C"). Effectively, the operation of transistor 187 is to generate at its collector an absolute magnitude signal which is always positive and which, at the moment of reset, differs from a fixed reference value by an amount proportional to the magnitude of the drop timing error as manifested by the difference between the values of the voltage peaks in waveforms A and C and their zero-error value. Where there is no error in drop timing, the negative-going peaks in waveform C at the moment of reset will be always at the same fixed value of voltage, say 9.0 volts in the particular embodiment being described. If the drop timing is early, the collector voltage will not yet have dropped to this same minimum positive value of 9.0 volts, and will only fall to and remain at some larger positive value as indicated, for example, in waveform C'. If the drop timing is late, the collector voltage will drop to the same minimum positive value of 9.0 volts as in waveform C, but then as shown by waveform C" will rise back to some larger positive value before reset occurs. In this way any drop timing error, regardless of direction of the error, always is reflected as a voltage higher than the zero error value of 9.0 volts on the transistor collector at the moment of reset of the RC timing sweep generator.

Figure 12:
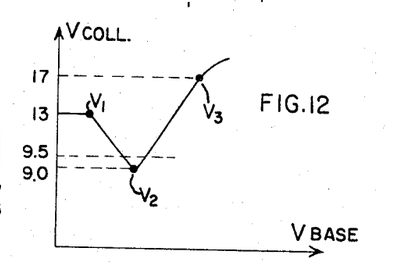
FIGURE 12 illustrates the manner in which the drop timing error magnitude signal is generated in the circuit of FIGURE 9.

The operation of transistor 187 to achieve this waveform characteristic can perhaps best be understood by reference to FIGURE 12, which shows transistor collector voltage along the ordinate and transistor base voltage along the abscissa. As shown, the collector voltage remains constant, at say 13 volts in this example, until the RC timing signal generator voltage rises to a value such that the back biasing of transistor 183 by resistors 185 and 186 is overcome, at which point ($v_1$) the resulting increase in current flow through transistor 187 causes its collector voltage to drop and to continue dropping until the transistor becomes saturated, at about 9 volts in the exemplary embodiment being described. At this point ($v_2$) the further increase in base-emitter current flow, due to the rising voltage on the transistor base, causes corresponding reduction in collector current flow and thus causes the collector voltage to again rise as indicated. In this way, any departure of the collector voltage from its value (9.0 volts) at the point $v_2$ at the moment of reset provides a measure of the extent of the deviation of the RC timing signal voltage from its design value.

Regardless of the direction of the drop timing error, the collector voltage as shown by the curve of FIGURE 12 will at reset always be higher than the minimum positive value $v_2$ (9 volts in this example) by an amount proportioned to the drop timing error, thus providing a measure of the absolute magnitude of the error. The back biasing of transistor 183 and the base-collector diode drop of transistor 187, and the flat which results therefrom in the curve of FIGURE 12, are desirable to facilitate the operation of the "no-drop" triggering circuit, the construction and operation of which will be discussed later.

The drop timing error magnitude signal generated at the collector of transistor 187 is transmitted by a lead 197 to a variable one-shot multivibrator and gating circuit designated generally by reference numeral 199. This circuit operates as will be explained to generate an error magnitude signal pulse which is triggered by the reception of each drop pulse at terminal 169 and is of duration proportional to the absolute magnitude of the drop timing error signal as supplied on lead 197. The variable duration output pulse on lead 200 from multivibrator circuit 199 constitutes a gating pulse to the flip-flop 191 which is operative to "enable" the flip-flop through the duration of each such pulse and to "disable" the flip-flop at other times. The operation of multivibrator 199 to produce these gating pulses will be further described hereinafter, after description of the means by which the gating pulses control operation of the flip-flop 191 and the drive motor which is in turn controlled by it.

Flip-flop 191 comprises a pair of transistors 201 and 203 having their respective bases and collectors cross coupled through resistors 205 and 207 in conventional fashion. The flip-flop thus constituted switches from a first state, in which transistor 201 is conducting and transistor 203 not, to a second state in which the reverse relationship holds, depending upon the relative magnitudes of the signals applied to the transistor bases. One such signal is the drop timing error direction signal on lead 189, which is coupled through the diode 209 to the base of transistor 201. The reference voltage against which this drop timing error signal voltage is compared is supplied through a diode 211 from a reference source of fixed value just equal to the peak value of the drop timing error signal voltage when the drops are precisely on time. The reference voltage may as shown be conveniently derived from a voltage divider constituted by resistors 213, 214 and 215 connected in series relation between the positive voltage supply and ground. Using the particular voltage values given by way of example in the embodiment described, the voltage reference provided by voltage divider 213–215, at the connection between resistors 214 and 215, is made just equal to 9.0 volts, which it will be recalled is the peak value reached by waveform B as impressed on lead 189 by transistor 187 when drops are occurring precisely on time.

Depending upon whether the peaks in this waveform B exceed or are exceeded by this reference voltage, one or the other of transistor 201 or transistor 203 may become conducting. Neither can become so, however, unless the lead 200 to which the transistor emitters have a common connection provides a path to ground. The grounding of this lead 200 is controlled by the variable one-shot multivibrator and gating circuit 199 in response to the drop timing error magnitude signal, the operation being such that lead 200 is effectively grounded by the multivibrator each time a drop pulse is received and is held at ground for a time period of duration proportional to the magnitude of the timing error of that drop. The flip-flop 191 thus is gated on and off by the variable one-shot multivibrator 199 and when gated on operates to connect, to the path to ground thus afforded, the collector of whichever one of the transistors 201 and 203 has the more positive signal on its base at the moment the flip-flop is gated on.

The output of the flip-flop 191 is by way of leads 217 and 219 connecting respectively to an "open" switch 221 and a "close" switch 223, the two switches being of identical construction as shown. Each such switch comprises a transistor 225 connected in common emitter configuration and connected for base signal input from the flip-flop 191, with each transistor being bypassed by a diode 227 which completes the motor drive current loop during one half of each cycle of the AC supply voltage. This motor drive circuit further includes a capacitor 229 in series with each of the switches 221 and 223, and one of the opposed windings 231 and 233 of the motor 235. A lead 237 from the common connection of these motor windings connects to a center tap of the power transformer 161. The motor drive circuit then is completed through the filter capacitor 165, which acts effectively as a short permitting free flow of this AC motor drive current, and through a lead 239 to each of the switches 221 and 223.

In operation of the motor drive circuit as thus far explained, the gating on of flip-flop 191 by the grounding of lead 200 through the multivibrator and gating circuit 199 on occurrence of a drop pulse, will cause one or the other of the switches 221 and 223 to become conducting, depending upon the magnitude of the drop timing error direction signal supplied on lead 189 as compared against the reference voltage supplied to the flip-flop from the voltage divider 213–215. Assuming the drop to be late, so the drop timing error signal will be of magnitude exceeding that of the reference voltage source, flip-flop 191 when gated on will close switch 221 to thus provide a unidirectionally conductive connection through its transistor 225, the polarity of the unidirectionally conductive connection thus afforded being opposite to that provided by the diode 227 in parallel therewith. The parallelled and oppositely poled unidirectionally conductive connections thus defined permit free flow of AC drive current through the loop including capacitor 229, motor winding 233, the lower half of the power transformer secondary, filter capacitor 165, and lead 239. During this time the switching transistor 225 in the other switch 223 is of course not conducting, and there can be no flow through the diode 227 in parallel therewith because no return is available for discharge of the capacitor 229 in series with the switch.

Under these conditions the motor 235 will drive in a direction to open the tubing constriction and decrease the time between drops so as to cause the next succeeding drop to occur at slightly earlier and more correct time. The necessary 90° phase shift for supply of quadrature current to the opposed motor winding 231 may be supplied by a single nonpolarized capacitor connected across the windings or, as shown, by a pair of electrolytics 241 having their point of common connection maintained always at voltage positive with respect to the motor windings by connection through a biasing resistor 243 to the DC voltage supply line.

In this way the drive motor 235 is energized to drive in a direction dependent upon the drop timing error direction signal as supplied to the flip-flop 191, and to drive for a time period dependent upon the length of the gating pulse supplied from the variable one-shot multivibrator 199. It might be noted here that since motor 235 is of synchronous type, it will not produce any net motion of the motor output drive shaft in response to an AC drive pulse of time duration less than some predetermined minimum, the width of this inherent deadband being dependent upon the motor design and also dependent upon the point during the AC supply voltage cycle at which the pulse begins and ends. Typically this deadband is in the range of 3 to 10 milliseconds, and pulses of shorter duration are not effective to produce any net motion of the motor output shaft. As will be explained, this deadband characteristic of synchronous motors as used in the control systems of this invention serves an important purpose in stabilizing the system against the hunting and dither frequently encountered in servo systems and particularly in those required to control over a range as wide as involved here.

With reference again to the multivibrator and gating circuit 199, this comprises a timing capacitor 245 and resistance element 247 connected in series relation, these preferably being of values such that the RC time constant they define is relatively low and so that capacitor 245 follows very closely the voltage appearing on the lead 197 to which it connects through the resistor 247. Capacitor 245 also connects via a lead 249 to the base electrode of a transistor 251 having a grounded emitter and forward biased so as to operate with a collector voltage of perhaps 1 volt in the absence of signal input on lead 249. This transistor will respond to negative going signals applied to its base by lead 249 to switch off and thus cause its collector to go more positive.

Also connecting to lead 249 are a resistor 253 which serves to control the duration of each multivibrator output pulse by controlling the rate of discharge of timing capacitor 245 in a manner to be explained, a lead 255 having interposed therein a diode 257 through which the "DROP PULSE" input on terminal 169 is coupled, and a make-up current source comprising resistors 261 and 267 and two diodes 263 and 265 which are poled as shown and one of which (265) is of Zener type. This current source, which serves a purpose to be explained, is controlled by a transistor 259 in accordance with a base signal input through a voltage divider network 269–271 connecting to the collector of transistor 251.

As previously indicated, the drive motor is switched on in response to each drop pulse and remains on for a period proportioned to the absolute magnitude of the drop timing error. As has also been explained, transistor 187 impresses on lead 197 a voltage of absolute magnitude which differs from a preselected reference value, 9.0 volts in the particular example being described, by an amount proportioned to the drop timing error. To enable measurement of this difference voltage, a transistor 273 is provided with its collector connected by lead 275 between the resistor 247 and capacitor 245, and its emitter connected by lead 277 to the reference voltage which in this example is constituted by the voltage divider resistors 213–215, at the connection between resistors 213 and 214. To be meaningful this voltage comparison must be made at precisely the same moment in time at which the drop occurs, and to provide such necessary synchronization the base of transistor 273 is connected through a resistor 279 to the collector of transistor 251, so that voltage comparison may be initiated in response to the "Drop Pulse" input at terminal 169 through this connection in a manner to be explained.

Considering first the case in which the drop occurs at precisely the correct time, the voltage on lead 197 will as shown by waveform C (FIGURE 11) be initially at 13 volts, then drop downwardly to be precisely at 9.0 volts at the moment the drop occurs. The voltage across the timing capacitor 245 will at this time be 8.3 volts, assuming a voltage level of 0.7 volts on the other lead 249 from the capacitor due to its connection to the base of transistor 251. The charging of capacitor 245 is otherwise unaffected by its connection to transistor 251 under these conditions, and charging is wholly unaffected by transistor 259 since that transistor remains back-biased by its connection to the collector of transistor 251. For the same reason charging is unaffected by transistor 273 which also is back-biased through this same connection.

It will be recalled that the drop pulses as produced by the drop sensor circuit of FIGURE 8 and impressed on terminal 169 in FIGURE 9 are negative-going pulses of relatively narrow width, say 5 milliseconds. The application of such pulses via lead 255 to the base of transistor 251 immediately and strongly back-biases that transistor and causes its collector to go approximately to the full value of the supply voltage, 20 volts in this example. This sharp change in collector voltage at transistor 251 will be applied to the bases of transistors 259 and 273, forward-biasing both these transistors and causing their respective collector voltages to shift to approximately the same values as their emitters.

Looking first at transistor 273, the result of this change is to connect the timing capacitor 245 to the reference voltage source to which lead 277 connects, thus placing the lefthand side of capacitor 245 at this fixed voltage, 9.3 volts in the example being described. Since as will later be discussed there is no low resistance path allowing instantaneous change in voltage across the capacitor 245, there must remain across the capacitor the 8.3 volt charge representing the difference between the 9.0 volts on lead 197 and the 0.7 volt on the base of transistor 251. Therefore, since the collector of transistor 273 has gone effectively to 9.3 volts and the voltage drop across the capacitor 245 cannot change instantaneously, it follows that the voltage on lead 249 must now go to 1.0 volt, 0.3 volt more positive than the value existing just prior to this transition. The positive-going voltage thus produced on lead 249 forward-biases the transistor 251 to render it again conducting and thus cause its collector voltage to again drop to 1 volt. Since this occurs very shortly after the negative-going pulse applied at 169 by the drop sensor, it is apparent that the multivibrator output pulse is of only very short duration under these conditions.

This multivibrator output pulse is transmitted by the transistor 259 which responds to the voltage rise on the collector of transistor 251 when that transistor is switched off by the drop pulse, to effectively drop the transistor 259 collector potential aproximately to ground through its emitter connection thereto. This effectively grounds the output lead 200, which conveys the gating signal thus constituted to the flip-flop 191. Transistor 259 serves also to prevent any current flow via diodes 263 and 265 to lead 249 during this reset operation; the voltage on lead 249 always is positive during reset under these conditions, so current flow is blocked by diode 263 when the collector of transistor 259 is aproximately at ground as it is during this operation.

As previously explained, the motor 235 will not respond to a drive current pulses of less than about 3 to 10 milliseconds. When the drop is precisely on time the drop timing error magnitude signal will be at 9.0 volts at the moment of its comparison against the 9.3 volts of the voltage reference on lead 277. Therefore, when this voltage comparison is initiated by reception of a drop pulse on lead 255, the voltage on the righthand side of capacitor 245 will, as shown by waveform D in FIGURE 11, momentarily go negative due to the negative polarity of the drop pulse, but then as a result of the more positive voltage of the reference will immediately go positive. This latter change is in a direction such that transistor 251 will immediately switch back to conducting state, thus switching transistor 259 back to nonconducting state and breaking the connection of lead 200 to ground through this transistor. The multivibrator output pulse under these conditions is therefore very short, and by design is made less than the 3 millisecond period required to permit any net motion of the drive motor 235. There accordingly will be no motion of this motor so long as the multivibrator 199 is being supplied with drop timing error magnitude signals indicating that the drops being sensed are precisely on time.

Considering next the operation of the circuit when the drop timing if off, it will be recalled that the drop timing error magnitude signal as supplied on lead 197 is an absolute magnitude signal and so any error voltage larger than that corresponding to a timing error equal to the motor deadband will always be positive with respect to the fixed reference voltage against which it is compared. This is so irrespective of whether the drop timing error is positive or negative, that is, whether the drops are premature or delayed with respect to the called-for drop time. The operation of the multivibrator 199 accordingly is the same whether the drop timing error is positive or negative, as shown by waveforms D' and D" showing the voltage on the righthand side of capacitor 245 following early and late drops respectively. In both cases there exists a substantial difference as between the drop timing error magnitude voltage to which capacitor 245 is charged and the fixed reference voltage against which this capacitor charge voltage is compared, and this difference is of polarity such that the voltage on the righthand side of capacitor 245 is negative for both early and late drops.

Assuming first that the drop is quite early, to the extent that the drop timing error magnitude signal on lead 197 is say 12 volts, there will exist just prior to reception of the drop signal and initiation of the reset operation, a voltage difference of perhaps 11.3 volts across the capacitor 245, assuming the base of transistor 251 to be at 0.7 volt. At the moment of reset, when the lefthand side of capacitor 245 is connected to the 9.3 volt fixed reference voltage source, the voltage on lead 249 to the righthand side of capacitor 245 must, in order to maintain this 11.3 volts difference across the capacitor, drop to minus 2.0 volts. This negative voltage on the base of transistor 251 will hold it nonconducting, and this in turn will hold the transistor 259 controlled thereby in conducting state, so the multivibrator output pulse taken from the collector of 259 accordingly will continue so long as this negative voltage exists on the base of transistor 251 and until the base voltage is restored to approximately 0.7 volt positive.

The time required for this restoring action, and consequently the time duration of the multivibrator output pulse, is determined by the time constant of the RC circuit comprising the capacitor 245 and resistor 253 through which the negative voltage on lead 249 is leaked to the DC power supply voltage. The time constant thus defined is selected to be of a value such that the motor drives for a time period and through a distance appropriate to the magnitude of the drop timing error which occasioned this motion, this selection being based on considerations of system response time and system stability. Because of the good stability of system operation afforded by the motor deadband characteristic previously explained, it is possible in systems in accordance with the invention to set this RC time constant sufficiently high as to provide relatively long motor drive pulses for substantial drop timing errors, without introducing system instability. Effectively the system sensitivity is nonlinearly reduced at small drop timing errors, so the design for relatively high sensitivity for larger errors does not detract from the stability of the system to quickly settle on and stabilize at the called-for drop timing value.

If the drop to which the system is responding was tardy rather than premature, the reaction of the multivibrator 199 to this input would be much the same since it still would sense the discrepancy as a departure of the voltage on lead 197 from the fixed reference voltage value as supplied on lead 277. However, and as shown by waveform C'' of FIGURE 11 and in FIGURE 12, in arriving at this value of drop timing error magnitude voltage at the point in time at which the voltage comparison against the reference is made, the capacitor 245 is first charged negatively as the voltage drops from 13 volts to 9 volts along the lefthand part of the curve of FIGURE 12, and then charges positively as the drop timing error magnitude voltage rises along the righthand part of the curve of FIGURE 12. During the latter part of this charge cycle the voltage on lead 249 will tend to go negative both because of the base-emitter current in transistor 251 necessary to hold it conducting, and because of the positive-going voltage on lead 197. The resulting negative voltage if permitted to occur on lead 249 and on the base of transistor 251 to which it connects would simulate a drop pulse input, since such pulse input is as previously noted a negative pulse, and might accordingly trigger the multivibrator in the same way as would reception of a true drop pulse.

Figure 10:
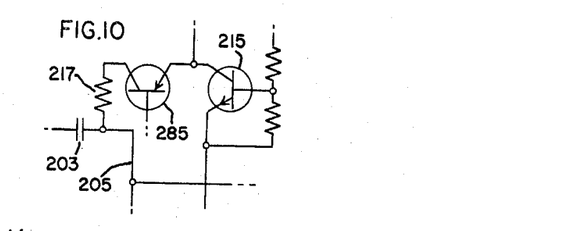
FIGURE 10 is a fragmentary schematic showing a component substitution in the circuit of FIGURE 8.

To prevent this, the diodes 263 and 265 and the resistors 261 and 267 in series therewith provide a make-up current flow to lead 249 effective to hold it at the desired value of approximately 0.7 volt positive in the absence of any drop signal input on lead 255. Such make-up current flow begins when the voltage on lead 197 becomes positive-going, after the break at $v_2$ in the curve of FIGURE 12, and the resulting negative-going voltage on lead 249 becomes sufficiently less positive to exceed the breakdown voltage of the Zener diode 265. Current flow through the diodes then continues until the multivibrator is triggered by a drop pulse input on lead 255. At this time, transistor 251 is switched off as before, switching transistor 259 on and grounding the common terminal of resistor 267 and Zener diode 265, thus terminating current flow therethrough. Reverse flow from lead 249 through resistor 261 to ground under these conditions is prevented by diode 263, which is poled as shown to prevent any such flow. If preferred, a transistor 285 having emitter-collector connections as shown in FIGURE 10, and having its base left unconnected, could be substituted for the two diodes 263 and 265 and would function in similar manner to serve the same purpose as do the diodes.

Summarizing operation as thus far described, if the drop in question is precisely on time, the 9.0 volt drop timing error magnitude signal on lead 197 when compared against the fixed 9.3 volt reference voltage on lead 277 will result in the application of a more positive voltage to the base of transistor 251 restoring that transistor to conducting state immediately after the drop pulse is received, so that the multivibrator output pulse is of duration approximately equal to the width of the drop pulse and accordingly is of the order of two milliseconds or so. The motor 235 accordingly does not respond. If the drop is either quite early or quite late, the drop timing error voltage on lead 197 will be substantially higher than the fixed reference voltage on lead 277, and as a result the voltage on lead 249 will be driven negative and will remain negative through a time period dependent upon the time constant of the RC circuit comprising capacitance 245 and resistance 253. The multivibrator output pulse will continue through this period and the motor will run through this same period less its deadband, the motor operating in a direction determined by the state of the flip-flop 191 at the moment at which the flip-flop 191 is gated on by the multivibrator.

There remains for consideration the case in which there is some drop timing error but the error is sufficiently small as to fall within the system deadband. Since as previously mentioned the motor deadband may be as wide as 10 milliseconds, the multivibrator output must be of this time duration in order to assure that the motor will respond to it. The duration of the multivibrator output is determined primarily by two factors, these being the RC time constant of the circuit including capacitor 245 and the resistor 253, and the level of charge on the capacitor 245 at the moment after comparison of the drop timing error magnitude signal voltage on lead 197 against the reference voltage on lead 277. These factors are in turn dependent upon other design parameters such as the slope of the curve of timing error signal magnitude in volts against drop timing error in seconds, since the slope of this curve determines the magnitude of the voltage difference in the drop timing error signal input which should not be responded to by the system.

A preferred approach to design formulation consistent with these interacting requirements consists of first selecting the values for capacitor 245 and resistor 253 to provide an RC time constant such that multivibrator output pulses for drop timing errors of substantial magnitude are of duration appropriate to correction of large timing errors. Then, using these selected capacitance and resistance values, and using a value of 10 milliseconds as the pulse duration required in order to assure response by the motor to the pulse, the value of forward bias voltage for transistor 251 required on lead 249 may readily be calculated from the relation:

$$i = C \frac{de}{dt}$$

In this relation the value of $i$ can be calculated with adequate accuracy by dividing the supply voltage by the resistance 253, since this resistor affords the only path for current flow to capacitor 245 and since the lead 249 to which it passes this flow is sufficiently close to ground that the voltage drop across the resistor may be approximated to the full supply voltage. The value of C is of course known having been selected in the preceding design step, and the value of $dt$ has in this example been specified to be 10 milliseconds. With typical but arbitrary values assigned to those parameters for which values have not already been stated, the resulting value of $de$ is 0.2 volt. This means that the voltage on lead 249 must go negative from its quiescent or steady state voltage level an increment of 0.2 volt for capacitor 245 to require a period of 10 milliseconds to discharge through resistor 253 back to its steady state voltage level, to then restore the transistor 251 again to conducting state.

The voltage increment thus arrived at as appropriate for establishing a multivibrator pulse duration of 10 milliseconds is the minimum value of drop error voltage to which the system will assuredly respond. However, particularly in applications such as intravenous flow control wherein extreme accuracy is less critical than stability of control, it may be desired that the system not respond to any drop timing error voltage unless the error voltage is of magnitude substantially larger than this 0.2 volt value corresponding to a 10 millisecond multivibrator output pulse. Any such spread desired, as for example the 0.5 volt spread shown in FIGURE 12, can be accommodated, with resultant improvement of system stability margins, by offsetting the value of the fixed reference voltage from the value of zero error drop timing signal voltage. Thus, in the example being described, the fixed reference voltage is selected to be 9.3 volts whereas the zero error drop timing signal voltage is 9.0 volts so that this reference voltage is offset by 0.3 volt. Such offset together with the 0.2 volt deadband afforded within the multivibrator circuit provides a total allowable swing of 0.5 volt in the value of the drop timing signal voltage from the zero error value of that voltage before the multivibrator generates an output pulse of duration sufficient to assure that the drive motor will move.

This voltage offset operates to improve system stability because when the drop timing error voltage is within the offset range the comparison of this voltage against the fixed reference voltage results in a change in the charge across capacitor 245 in a direction such that the lead 249 is driven more positive, to thus more quickly restore the transistor 251 to its conducting state and in the process to terminate the multivibrator output pulse while it remains still much too short to produce any motion of the output motor. In other words, if the drop timing error voltage falls within the range of 9.0 to 9.3 volts, the result of comparison of this voltage against the 9.3 volts of the fixed voltage reference source will be to drive the base of transistor 251 more positive, thus tending to forward-bias the transistor and cause it to resume conducting immediately on cessation of the drop pulse input signal. If the drop timing error signal voltage is in the range 9.3 to 9.5 volts the voltage on lead 249 will be driven negative from the zero bias potential, which in this example has been set at 0.7 volt, by something less than 0.2 volt. Transistor 251 then will be reverse biased and so will remain nonconducting until this 0.2 volt charge on capacitor 245 is leaked through resistor 253, but since as previously explained this will require less than 10 milliseconds the multivibrator output will be of such short duration that there normally will occur no net movement of the motor in response to a drop timing signal voltage in this range.

If the drop timing signal voltage exceeds 9.5 volts then the action of the comparator circuit is to impress on lead 249 a voltage which is greater than 0.2 volt more negative than the zero bias voltage, and the time required for discharge of capacitor 245 through resistor 253 then will be correspondingly lengthened. The multivibrator output pulse will be similarly lengthened and so will assure movement of the drive motor in the direction determined by the drop timing error direction signal as transmitted on lead 189.

The multivibrator 199 also transmits an output pulse via lead 171 to the reset circuit 159, where the pulse is applied to the base of a switching transistor 287 operative when switched on by the leading edges of such pulses to short the hot side of capacitor 155 to ground and thus discharge it preparatory to another RC timing signal cycle. The discharge circuit includes, however, a diode 289 connected so that upon reset the voltage on the lower or cold side of capacitor 155 becomes negative by a value of voltage dependent upon diode voltage drop, this typically being of the order of 0.6 volt. The negative voltage thus generated is applied to the base of a transistor 291 which normally is forward biased so as to permit the charging current flow for capacitor 155 through its base emitter diode connection to ground. The reverse bias placed on transistor 291 by this 0.6 approximately negative voltage switches the transistor 291 off and thus prevents flow of charging current so long as negative voltage remains at the transistor base. This voltage can discharge only through resistor 293, so the period during which the transistor 291 remains switched off is dependent upon the time constant of the RC circuit comprising capacitor 155 and resistor 293, and of course the value of the supply voltage to which resistor 293 connects. The RC circuit components are selected to provide a time constant such that the transistor 291 remains reversed biased by the charge stored on capacitor 155 for a time period of several milliseconds, perhaps 6 milliseconds in a system having the performance characteristics previously mentioned. During this period, transistor 291 provides an output signal via lead 295 which is additive to the multivibrator output signal on lead 171 and which, like it, is applied to the base of transistor 287. This signal is operative to hold transistor 287 in conducting state, to thus hold the lead 173 to capacitor 155 at ground through the delay period defined by the RC elements 155 and 293.

In this way, transistor 287 is maintained in conducting state, and operates to hold the capacitor 155 shorted to ground, until both its base input signals, namely that from multivibrator 199 on lead 171 and that from transistor 291 on lead 295, have terminated. Since the transistor 291 effectively produces an output pulse on lead 295 of fixed time duration, about 6 milliseconds in the particular example being described, transistor 287 always will remain conducting, when triggered by the pulse on lead 171 from the multivibrator, for a time period of at least this duration. Then, depending upon whether the pulse on lead 171 has yet terminated the transistor 287 will either immediately become nonconducting or will continue in conducting state until termination of the multivibrator output pulse on lead 171. Capacitor 155 accordingly cannot begin to again charge and to start a new RC timing signal cycle until the termination of the last-to-end of these two control pulses, thus assuring that the RC circuit does not again begin to charge until after the multivibrator 199 and the motor drive circuits controlled thereby have completed their respective cycles of operation.

The precise timing of the switching of transistor 287 to initiate this reset cycle is important, since if reset were to begin to occur prior to the moment in time at which the transistor 273 is switched on to connect leads 197 and 277 for comparing the drop timing error magnitude signal against the voltage reference, such comparison might be of a signal voltage which would then already be changing as a result of the reset operation. A similar problem might occur with the flip-flop 191, since the direction in which it energizes the motor is also dependent upon comparison of a drop timing error direction signal against a fixed reference at the exact moment the drop occurs. To avoid these problems, transistors 259 and 273 are less strongly reverse biased than transistor 287, so that while all three of these transistors are switched by the same control signal, namely the positive-going voltage on the collector of transistor 251 at the moment of reception of the drop pulse on lead 255, the transistors 259 and 273 respond slightly more quickly than does transistor 287, to provide at least enough lead to assure that reset through transistor 287 cannot begin to commence until after the voltage comparisons initiated by the transistors 259 and 273 have been accomplished.

From what has already been said regarding fluid flow rate settings and regarding the times between drops which correspond to different fluid flow settings, it will be apparent that at the lowest of desired fluid flow rate settings the time between drops may become quite long, for example 36 seconds for a fluid flow rate of 10 cc. per hour which is sometimes useful. Since the control circuit as thus far described does not initiate any control or corrective action except upon reception of and in response to a drop signal pulse, it follows that in changing from a very low fluid flow setting such as 10 cc. per hour to a relatively higher one, the system could respond only slowly since it would take corrective action initially only once every 36 seconds. While the times between subsequent corrective steps would successively decrease, and the corrective action initially would be substantial because of the large error sensed, still the time to achieve the called-for fluid flow rate when proceeding in this direction of change could be undesirably long. To substantially shorten this required time period, there may be provided the "no-drop" circuit 195 previously mentioned.

This circuit operates to generate a simulated drop pulse whenever the drops themselves are delayed by amounts sufficient to generate a drop timing error magnitude signal of predetermined voltage level. Referring to FIGURE 12, it will be noted that if a drop is either on time or is early, the drop timing error magnitude voltage can never exceed 13 volts in the particular example being described, but if the drop is late the error voltage after droping to point $v_2$ may subsequently rise past the 13 volt level and if reset still does not occur may continue to rise to the full value of power supply voltage. The "no-drop" circuit takes advantage of this drop timing error voltage indication of long drop delay, and responds to an error voltage of some predetermined higher value $v_3$ to produce a false drop pulse which initiates operation of the control cycle in the same way as previously described for the true drop pulse.

To this end, the "no-drop" circuit comprises a pair of transistors 297 and 299, the transistor 297 being back-biased by a base connection to the same fixed reference voltage source (voltage divider 213–215) which provides the voltage reference for the drop timing error direction and drop timing error magnitude comparisons. When transistor 297 becomes forward biased, due to the drop timing error voltage rising to such high level as to indicate an excessive drop delay, transistor 297 drives the base of transistor 299 positive, causing its collector to go negative and to produce at the drop pulse input terminal 169 a negative-going pulse effective to trigger the multivibrator 199 and to initiate a control cycle in the same manner as would a true drop pulse from the drop sensor.

It will be noted that in some cases a true drop signal could be received at the input terminal 169 immediately after the system had completed a control and reset cycle responsive to a simulated drop pulse from the "no-drop" circuit. Should this occur, the control system would interpret this true drop signal to be indicative of a premature drop, since it would seem to have followed too closely after the simulated drop pulse, and accordingly would tend to drive the motor in a direction to again increase the time between the drops, thus tending to drive back toward the same condition which existed prior to the "no-drop" signal. However, because the maximum error voltage which can be generated by an early drop is limited to 13 volts in the particular embodiment being described, while the "no-drop" signal voltage $v_3$ is at higher level, say 17 volts in this particular embodiment, the output generated by multivibrator 199 in response to the "no-drop" signal always will be of duration greater than the duration of any pulse generated in response to the next following true drop signal. Hence there necessarily will be a net movement of the motor in fluid flow increase direction, and the system accordingly cannot become hung up or oscillate between opening commands of a "no-drop" signal and closing commands of a true drop signal.

As described above with reference to FIGURE 2, in setting up fluid flow control equipment in accordance with this invention the operator simply inserts the usual flexible tubing into a slot in the control housing within which operates the cam driven by the output motor. To fully retract this cam to facilitate introduction of the tubing into position under it, the "hundreds" decade switch 179 in the circuit of FIGURE 9 preferably is provided with an "LD" or load position in which the resistance element 301 then in circuit is of such low value as effectively to call for infinite flow rate. This operates to drive the motor in a direction to move the cam to full open position, so that the tubing may readily be inserted into position between the cam and bearing surface.

The fluid flow rate setting switches 175 and 177 also preferably include an "OFF" setting in which the corresponding switch terminal is simply left open. Then when the two switches both are set to "OFF" position there is no voltage supply to the RC timing signal generator, there can be no "no-drop" pulse generated and there accordingly is no "no-drop" pulse input on lead 255 to trigger action of the multivibrator 199 or the remainder of the control circuit, nor is there any actual drop signal until the operator releases the tubing clamp to initiate flow. Normally before releasing the clamp the fluid flow rate setting switches 175 and 177 will have been moved to some flow rate setting other than "OFF" so the system will proceed directly to the called-for fluid flow rate once control operation is initiated by falling of drops through the drop chamber. However, if the switches should be left on their "OFF" setting the system then will simply drive in closing direction to fully constrict the tubing and to cut off fluid flow until the switches are subsequently set to some other position.

As previously noted, the values of the various resistors in the "tens" and "hundreds" banks 179 and 181 are selected such that the RC timing circuit charges to the same voltage level for all flow rates, provided the timing of drops is correct for the called-for flow rate. For this to hold, the effective resistance "R" at each flow rate setting must conform to the relation $$R = -\frac{T-t}{C \ln (1-v/V)}$$

where "T" is the calculated time (seconds) between drops for the called-for flow rate, "t" is the steady state or minimum dead time (in seconds) introduced by the reset circuit 159 (6 milliseconds in this example), C is the value of capacitor 155 (microfarads), "v" is the voltage to which capacitor 155 charges with on-time drops (9 volts in this example), and V is the supply voltage (20 volts in this example).

By way of illustration, for a 300 cc./hr. flow rate, for which the time "T" between drops is 1.2 seconds, and with a capacitance "C" at 155 of 1.0 microfarad, the value of R is found to be approximately 2.0 megohms, which is constituted by all the series-connected resistors of the "hundreds" bank below the 300 cc./hr. switch position. For flow rates of other than even hundreds the "tens" bank is paralleled with the "hundreds" one and the combined resistance value then is similarly calculated.

It might be noted that for such mixed flow rates, i.e., flow rates requiring the inclusion of both "tens" and "hundreds" bank resistors, the calculated values of the resistors will be found to be slightly different than for non-mixed rates. This difference is due to the inclusion of the factor "*t*" in the above equation, and is largest at high flow rates. However, such difference and any possible inaccuracy introduced thereby will if calculated be found to be of negligible magnitude even if not compensated, and in practice it has been observed that automatic compensation is afforded by a normal slight increase in drop size with increasing flow rate.

What is claimed as new and desired to be secured by Letters Patent of the United States is:

1. For regulating fluid flow through a flow line having interposed therein a drop chamber in which flow occurs in the form of discrete drops, apparatus comprising:
 (a) drop sensing means responsive to said drops to produce in time synchronism with each thereof an electrical pulse;
 (b) drop timing error signal generating means responsive to said drop pulses and providing a time reference against which pulse timing may be measured to produce error signals indicative of any timing error of each individual drop;
 (c) flow adjusting means; and
 (d) control means operatively connected to said flow adjusting means and responsive to said drop timing error signals and to said drop pulses to initiate upon each such pulse a control cycle in which corrective actuation of said flow adjusting means is dependent upon the drop timing error signals generated in response to that drop pulse which initiated the cycle.

2. Flow regulating apparatus as defined in claim 1 wherein said drop timing error signal generating means produces two distinct error signals in response to each drop, the first such signal being indicative of drop timing error direction and the second indicative of drop timing error magnitude, and wherein said flow adjusting means is actuated in a direction dependent upon said drop timing error direction signal and for a time period of duration proportioned to said drop timing error magnitude signal.

3. Flow regulating apparatus as defined in claim 2 wherein said flow adjusting means and said control means therefor provide a range of deadband such that said flow adjusting means is actuated by said control means only in response to drops for which the corresponding drop timing error magnitude signals indicate a drop timing error exceeding a predetermined minimum.

4. Flow regulating apparatus as defined in claim 1 wherein said drop timing error signal generating means comprises an RC charging circuit and a comparator circuit including a fixed voltage reference against which the capacitor charge voltage is compared to derive said error signals, wherein said charging and comparator circuits respond to each said drop pulse to reset the charging circuit just after comparison of the charge voltage against the reference to thereby derive a signal indicative of the timing error of that drop pulse, and wherein the time constant of said RC charging circuit is variable to provide different flow rate settings.

5. Flow regulating apparatus as defined in claim 4 including means responsive to RC charging circuit voltage above a predetermined high value to produce an electrical pulse which simulates a drop pulse and is operative in the same way to initiate a control cycle and reset the charging circuit.

6. Flow regulating apparatus as defined in claim 1 wherein said flow adjusting means comprises flow constricting means into operative engagement with which said flow line may be inserted, rotary motor means actuated by said control means, and cam and cam follower members coupling said motor means to said flow constricting means for effecting flow rate adjustment, said cam member including a first generally uniformly curved portion of large angular extent on which said follower member operates through the control range and a second generally flat portion of small angular extent providing a retracted position for said follower member facilitating introduction of said flow line into said flow constricting means.

7. For regulating flow rate through a fluid flow line having interposed therein a drop chamber in which flow occurs in the forms of discrete drops, drop sensing and control means comprising:
 (a) a pair of opposed electrodes disposed one on each side of and closely adjacent to said drop chamber to define therewith a capacitor having a value of capacitance which varies upon passage of each drop through the chamber;
 (b) electrical signal generating means providing a carrier signal output;
 (c) electrical signal detecting means capacitatively coupled to said signal generating means through said variable capacitor so that said carrier signal is modulated by capacitance variations occasioned by passage of drops through the chamber and the resulting modulation is detected by said signal detecting means to produce an electrical pulse in time synchronism with each drop;
 (d) fluid flow adjusting means; and
 (e) means responsive to said drop pulses for actuating said fluid flow adjusting means so as to maintain a predetermined fluid flow rate.

8. Flow regulating means as defined in claim 7 wherein said last-named means includes means providing a drop timing reference and means for deriving therefrom a drop timing error indication for each individual drop pulse in response thereto, and further includes means also responsive to each said drop pulse for actuating said fluid flow adjusting means if said drop timing error indication for that pulse shows adjustment to be necessary.

9. Electrical regulating means for maintaining at predetermined value a system operating parameter any deviation of which from the predetermined value is manifested as an electrical pulse timing error of direction and magnitude dependent upon the direction and magnitude of the deviation, comprising:
 (a) adjustment means selectively operable to adjust the value of said controlled parameter;
 (b) pulse timing reference means including a timing signal generator providing a timing signal output changing with time until restored to starting value by reset of the generator, and further including a reference signal of fixed value;
 (c) comparator means responsive to each of said electrical pulses to effect a comparison of said timing signal against said reference and operative to produce an error signal output indicative of any timing error of the pulse which effected such comparison;
 (d) reset means responsive to each of said electrical pulses to reset said timing signal generator following comparison of its signal output against said reference; and
 (e) control means responsive to each of said electrical pulses and to said pulse timing error signal to initiate upon the occurrence of each pulse a control cycle including actuation of said adjustment means toward such corrective adjustment of the controlled parameter as may be indicated to be required by said pulse timing error signal.

10. Electrical regulating means as defined in claim 9 wherein said timing signal generator includes an RC charging circuit providing a sawtooth voltage from which is derived the timing signal output, wherein said reference signal is a fixed voltage against which the timing signal is compared at the moment of each pulse to derive said pulse timing error signal, and wherein the time constant of said RC charging circuit is adjustable to vary the value of the controlled parameter to be maintained.

11. Electrical regulating means as defined in claim 9 wherein the pulse timing error signal output of said timing signal generator and comparator means includes a first signal the polarity of which indicates the direction of pulse timing error and a second signal the absolute value of which indicates the magnitude of pulse timing error, wherein said control means actuates said adjustment means in a direction determined by the polarity of said pulse timing error direction signal and to an extent during each control cycle proportioned to the absolute value of said pulse timing error magnitude signal.

12. Electrical regulating means as defined in claim 11 wherein said adjustment means comprises a motor and said control means comprises directional switch and gate means for control of motor drive current supply, said directional switch means determining the direction of motor drive in response to said pulse timing error direction signal and said gate means proportioning the duration of motor drive current supply during each control cycle to the absolute value of said pulse timing error magnitude signal.

13. Electrical regulating means as defined in claim 11 wherein said reference signal against which said timing signal is compared to derive said pulse timing error magnitude signal is offset from the zero error value of the timing signal so that when the pulse error is within the range of said offset the timing error magnitude signal is of polarity reversed with respect to the normal polarity of magnitude signals outside this range, and wherein said control means is responsive only to timing error magnitude signals of such normal polarity to actuate said adjustment means.

14. Electrical regulating means as defined in claim 11 wherein said timing signal generator and comparator means include means limiting the absolute value of said pulse timing error magnitude signal for input pulses which are early in time, and further include means responsive to an absolute value of said pulse timing error magnitude signal substantially higher than said early pulse limit value to produce an electrical pulse operative to initiate a control cycle in the same manner as an input electrical pulse.

15. Electrical regulating means as defined in claim 11 wherein said comparator and control means comprise multivibrator means triggered from a first state to a second state in response to each said pulse and maintained in said second state by the pulse error magnitude signal for that pulse through a time period proportioned to the absolute value of the magnitude signal, and wherein said multivibrator provides a control output to said motor means through the period the multivibrator remains in its said second state.

16. Electrical regulating means as defined in claim 15 wherein the duration of said multivibrator control output is determined by an RC discharge circuit the capacitive element of which is initially charged to a voltage dependent upon said timing signal and then compared against said reference voltage to derive said pulse timing error magnitude signal, the absolute value of this magnitude signal determining the voltage level from which said RC circuit must discharge to terminate the multivibrator control output.

17. Electrical regulating means as defined in claim 15 wherein said reset means includes a delay means for delaying reset of said timing signal generator through a delay period of length no shorter than the period said multivibrator remains in its said second state.

References Cited
UNITED STATES PATENTS

| | | | |
|---|---|---|---|
| 3,174,504 | 3/1965 | Rosenbrock et al. | 137—486 |
| 3,229,077 | 1/1966 | Gross | 137—101.19 X |
| 3,272,217 | 9/1966 | Young | 137—101.19 |

ARNOLD ROSENTHAL, *Primary Examiner.*

U.S. Cl. X.R.

137—487.5; 251—9